United States Patent [19]

Iyoda et al.

[11] Patent Number: 4,504,839

[45] Date of Patent: Mar. 12, 1985

[54] DEFLECTING ELECTRODE ASSEMBLY FOR MULTI-NOZZLE INK JETS

[75] Inventors: Tetsuo Iyoda; Masayoshi Tamai, both of Kanagawa, Japan

[73] Assignee: Fuji Xerox Co., Ltd., Tokyo, Japan

[21] Appl. No.: 633,665

[22] Filed: Jul. 23, 1984

Related U.S. Application Data

[63] Continuation of Ser. No. 390,430, Jun. 21, 1982, abandoned.

[30] Foreign Application Priority Data

Jul. 24, 1981 [JP] Japan ............................... 56-115398

[51] Int. Cl.$^3$ ............................................. G01D 15/18

[52] U.S. Cl. .................................. 346/75; 346/140 R

[58] Field of Search .............. 346/75, 140 R, 140 PD; 400/126

[56] References Cited

U.S. PATENT DOCUMENTS 4,074,277 2/1978 Lane et al. ............................ 346/75

4,314,259 2/1982 Cairns et al. .......................... 346/75

4,347,522 8/1982 Bahl et al. ............................ 346/75

*Primary Examiner*—A. D. Pellinen

*Assistant Examiner*—Todd E. DeBoer

*Attorney, Agent, or Firm*—Sughrue, Mion, Zinn, Macpeak & Seas

[57] ABSTRACT

A deflecting electrode assembly for deflecting parallel trains of ink droplets in a multi-nozzle ink jet printer has upper and lower deflecting electrodes oriented parallel to the direction of travel of the trains of ink droplets. The electrodes are equal in width, and the distances between each side edge of the lower deflecting electrode and the outermost train of ink droplets closest thereto are equal. These distances are at least $4\frac{1}{2}$ times the distance between the adjacent trains of ink droplets. In addition, the upper and lower deflecting electrodes are separated by a distance between 1 and 2 mm. Such a deflecting electrode assembly creates an electrostatic shield effect which reduces the electrostatic mutual action of the ink droplets, thereby resulting in an improved print position on a recording sheet.

4 Claims, 5 Drawing Figures

DEFLECTING ELECTRODE ASSEMBLY FOR MULTI-NOZZLE INK JETS

This application is a continuation of application Ser. No. 390,430, filed June 21, 1982 now abandoned.

BACKGROUND OF THE INVENTION

1. Field of the Invention

The present invention relates to a deflecting electrode assembly for deflecting parallel trains of ink droplets in a charge control type ink jet printer.

2. Description of the Prior Art

In a conventional charge control type ink jet printer, charged ink droplets travel through an electrostatic field and are deflected as desired in order to control the print positions of the ink droplets. In order to improve the print quality in this type of ink jet printer, it is necessary to increase the accuracy of the print positions of the ink droplets.

Since the accuracy of the print positions is reduced due to air resistance against the traveling ink droplets and by the electrostatic mutual action between the ink droplets, a "guard drop" method has been proposed to improve the accuracy of the print positions. In the "guard drop" method, ink droplets having a certain charge level (the charge level being zero in many cases) are disposed between the ink droplets to be used for printing to reduce the effect caused by an electrostatic repulsive force. In many cases, the amount of charge on the guard ink droplets and the diameter of the ink droplets is random, and a significant number of the guard ink droplets have no charge deposited thereon. The guard drop method is simple in principle and can be practiced readily; however, a serious drawback thereof is that the resulting printing speed is quite low.

In another conventional charge control type ink jet printer, the amount of charge applied to the printing ink droplets is corrected and calculated in advance to reduce the effect due to the electrostatic repulsive force. However, this method is disadvantageous because the control circuit for such an ink jet printer is intricate, and, accordingly, the manufacturing cost of the ink jet printer is very high. Thus, most conventional ink jet printers employ aspects of both of the two methods discussed above in an attempt to minimize the above-noted disadvantages. However, such ink jet printers have limited printing speed and are relatively expensive.

Recently, an ink jet printing system having a plurality of nozzles has been proposed to increase the printing speed of the ink jet system. However, in these multi-nozzle ink jet systems, the amount of charge deposited on the ink droplets is not uniform, which makes the mutual action between the ink droplets non-uniform. In order to solve this problem, the construction of the multi-nozzle printer becomes intricate and costly. In addition, since the electrical control is complicated, the correcting operation is difficult to perform.

As is apparent from the above description, in the case where a plurality of nozzles are employed in the charge control type ink jet printer, the print quality and the printing speed cannot be improved without making the arrangement of ink droplets and the control system intricate. Thus, the cost of a multi-nozzle charge control type ink jet printer is excessive.

SUMMARY OF THE INVENTION

An object of the present invention is to provide a multi-nozzle ink jet printer which has a high printing speed and good printing quality. The drawbacks of the prior art have been overcome by providing a deflecting electrode assembly for a multi-nozzle printer which results in a reduced electrostatic repulsive force between ink droplets.

In the deflecting electrode assembly of the present invention for use in a multi-nozzle ink jet printer, at least two trains of ink droplets, formed by the plurality of nozzles, travel through a space defined by upper and lower deflecting electrodes in such a manner that the trains of ink droplets travel parallel to a plane containing the lower deflecting electrode. A longitudinal central line connecting the ink droplets in each train is aligned parallel with a longitudinal central line of the lower deflecting electrode. The distance between the trains of ink droplets and the lower deflecting electrode is between 0.2 and 0.4 mm, and the distance between the outermost end ink droplet train and an edge of the lower deflecting electrode is at least $4\frac{1}{2}$ times the distance between adjacent trains of ink droplets. Also, the upper and lower deflecting electrodes are equal in width.

DESCRIPTION OF THE PREFERRED EMBODIMENTS

Figure 1A:
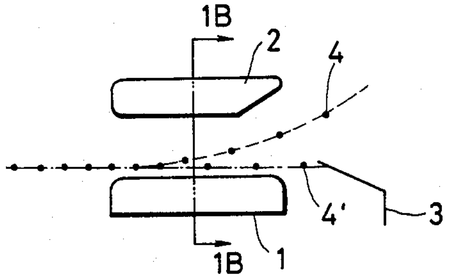
FIGS. 1(A) and 1(B) are schematic diagrams of the arrangement of a deflecting electrode assembly for a multi-nozzle ink jet printer according to the present invention.
Figure 1B:
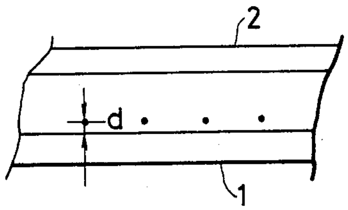
Figure 2:
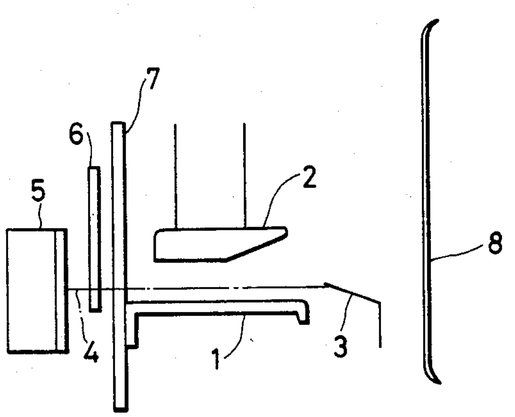
FIGS. 2 and 3 are a side view and a plane view, respectively, of one embodiment of the deflecting electrode assembly according to the present invention.
Figure 3:
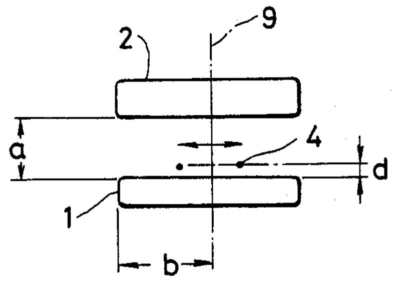
Figure 4:
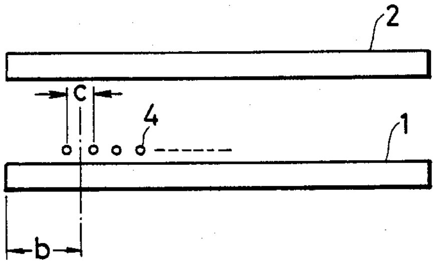
FIG. 4 is a diagram showing the positional relationships between trains of ink droplets and one edge of a deflecting electrode where a number of ink nozzles are employed.

FIGS. 1–3 are diagrams showing a deflecting electrode assembly of the present invention. FIG. 1(B) is a sectional view taken along line 1B—1B in FIG. 1(A). In FIGS. 1–3, trains of ink droplets 4, charged according to a character to be printed, are deflected while passing through an electric field formed by an upper deflecting electrode 2 and a lower deflecting electrode 1 which are arranged parallel to one another. In addition, the upper and lower deflecting electrodes 2, 1 are arranged so that a central line 9 between the trains of ink droplets is aligned with a common central line of the upper and lower deflecting electrodes 2 and 1. The trains of ink droplets 4 travel parallel to a plane containing the lower deflecting electrode 1, and the distance d (FIG. 1(B)) between the trains of ink droplets 4 and the lower deflecting electrode 1 is set between 0.2 and 0.4 mm. The outer edges of the lower deflecting electrode 1 extend sideways past the outermost trains of ink droplets, as best shown in FIG. 3. More specifically, the edges of the lower deflecting electrode 1 extend past the outermost trains of ink droplets by a distance which is equal to or greater than $4\frac{1}{2}$ times the distance between adjacent trains of ink droplets. Therefore, the distance b, shown in FIG. 4, which extends between a central line located between the outermost train of ink droplets and the train of ink droplets adjacent thereto and the outer edge of the lower deflecting electrode 1, is 5 times as long as the pitch distance (c) between the trains of ink droplets. The common central line of the upper deflecting electrode 2 is aligned with that of the lower deflecting electrode 1, and the distance a between electrodes 1 and 2 is between 1 and 2 mm.

In the deflecting electrode assembly for multi-nozzle ink jets according to the present invention, the electrostatic mutual action between the trains of formed and charged ink droplets is reduced so that the accuracy of the print positions is improved. As the distance d is decreased, the electrostatic shield effect is increased. Therefore, the mutual action between ink droplets, which is great during the initial deflection period thereof, is reduced as the distance d is decreased. In order to ensure this electrostatic shield effect, it is desirable to reduce the distance a between the two electrodes as much as possible, and to sufficiently increase the distance b between the outermost trains of ink droplets and the edges of the lower deflecting electrode 1.

One embodiment of the deflecting electrode assembly for multi-nozzle ink jets, according to the present invention, will be described below with reference to FIGS. 2 and 3.

In FIG. 2, an ink droplet forming unit 5 forms trains of ink droplets which are selectively charged by a charging electrode according to a character pattern. The ink droplets thus charged are deflected, according to the amounts of charge applied thereto, while passing through the upper and lower deflecting electrodes 2 and 1. The deflection of the ink droplets, which has been caused while the ink droplets are traveling through the two electrodes 2, 1 during the initial traveling period described above, is increased until the ink droplets reach a recording sheet 8. Therefore, in the case of FIG. 2 in which two nozzles are used, the electrostatic shield effect of the two electrodes is obtained by making the distance d sufficiently small. The electrostatic shield effect results because the electrodes are made of a metal material, such as stainless steel.

In an example using two nozzles, when the distance d was 0.3 mm, the nozzle pitch distance was 2 mm, the average amount of charge was 0.5 pC, an initial jet speed was 18 m/sec. the maximum deflection due to the mutual action of ink droplets was 20 mm at a recording sheet 8 located 28 mm from the ink droplet forming unit 5. In the example, in order to ensure a positive shield effect, the distances a and b were set to 1.5 mm and 20 mm, respectively. This example has been described with reference to the case of two jets; however, it should be noted that the same shield effect can be expected for more than two jets, and it is not limited by the number of nets.

With the deflecting electrode assembly for multi-nozzle ink jets according to the present invention, the electrostatic mutual action of ink droplets during the initial deflection period, which greatly affects the print position accuracy, is reduced, with the result that the print quality is significantly improved.

We claim:

1. A deflecting electrode assembly for deflecting parallel trains of ink droplets in an ink jet printer, each train of ink droplets being generated by an ink jet, said ink jets being disposed in a line so that said train of ink droplets travels in a common plane, thus forming a first plane of ink droplets, comprising:

an upper and a lower deflecting electrode, said deflecting electrodes being equal in width and parallel to one another, a second plane containing said lower deflecting electrode being parallel to said first plane of ink droplets, a longitudinal central line of said lower deflecting electrode in said second plane being parallel to a direction of travel of said trains of ink droplets, a first distance (d) between said first plane of ink droplets and said lower deflecting electrode being: $0.2\text{ mm} \leqq d \leqq 0.4\text{ mm}$, a second distance (b) measured from a central line between an outermost train of ink droplets and a train of ink droplet adjacent thereto to an outer edge of said lower deflecting electrode being at least 5 times a third distance (c) between adjacent trains of ink droplets, said outer edge of said lower deflecting electrode extending past said outermost train of ink droplets, and a fourth distance (a) between said upper and lower electrodes being $1\text{ mm} \leqq a \leqq 2\text{ mm}$.

2. The deflecting electrode assembly claimed in claim 1 wherein said longitudinal central line of said lower deflecting electrode is equidistant from said outermost trains of ink droplets.

3. The deflecting electrode assembly claimed in claim 1 wherein said upper and lower deflecting electrodes are made of a metal material.

4. The deflecting electrode assembly claimed in claim 3 wherein said metal material is stainless steel.

* * * * *